(12) United States Patent
Bernhard et al.

(10) Patent No.: US 7,043,999 B2
(45) Date of Patent: May 16, 2006

(54) CONTACTLESS MEASUREMENT OF THE STRESS OF ROTATING PARTS

(75) Inventors: Josef Bernhard, Erlangen (DE); Joachim Hering, Wuerzburg (DE); Rainer Wansch, Erlangen (DE); Sven Gempper, Volkach (DE); Wolfram Strauss, Erlangen (DE)

(73) Assignee: Fag Kugelfischer Georg Shäfer AG, Schweinfurt (DE)

( * ) Notice: Subject to any disclaimer, the term of this patent is extended or adjusted under 35 U.S.C. 154(b) by 60 days.

(21) Appl. No.: 10/486,590

(22) PCT Filed: Aug. 9, 2002

(86) PCT No.: PCT/EP02/08957

§ 371 (c)(1),
(2), (4) Date: Jul. 22, 2004

(87) PCT Pub. No.: WO03/014686

PCT Pub. Date: Feb. 20, 2003

(65) Prior Publication Data

US 2004/0244496 A1  Dec. 9, 2004

(30) Foreign Application Priority Data

Aug. 11, 2001  (DE) .................. 101 39 659
Jun. 4, 2002  (DE) .................. 102 24 792

(51) Int. Cl.
*G01N 29/04* (2006.01)

(52) U.S. Cl. ....................................................... 73/801

(58) Field of Classification Search .................. 73/801, 73/862, 862.381, 862.59
See application file for complete search history.

(56) References Cited

U.S. PATENT DOCUMENTS

| | | | |
|---|---|---|---|
| 4,403,218 A * | 9/1983 | Beal et al. | 340/870.18 |
| 5,874,682 A * | 2/1999 | Schafer et al. | 73/862.338 |
| 6,661,220 B1 * | 12/2003 | Glehr | 324/207.17 |

FOREIGN PATENT DOCUMENTS

CA  2127282  7/1993

(Continued)

OTHER PUBLICATIONS

Pohl et al., Wirelessly interrogable surface acoustic wave sensors for vehicular applications, IEEE Transactions on Instrumentation and Measurement, vol. 46, No. 4, Aug. 1997.

(Continued)

*Primary Examiner*—Max Noori
(74) *Attorney, Agent, or Firm*—Hunton & Williams

(57) ABSTRACT

The invention relates to a method for measuring mechanical stresses of a rotating part (1) in an essentially closed metal housing. The rotating part comprises a sensor (2) which reflects electromagnetic waves and which can be measurably deformed as a result of a mechanical stress exerted on said rotating part (1) The two antennas (A1, A2) receiving the reflected signals of the sensor (2) are arranged in the bearing housing (10) in such a way that they cannot rotate in relation to the sensor and are distanced (α). Said antennas emit receiving signals (a1,a2) which are sent to an electronic evaluation system (20,21) which measures the mechanical stresses of the rotating part (1) on the basis of both receiving signals (a1,a2).

21 Claims, 3 Drawing Sheets

SECTION II-II

FOREIGN PATENT DOCUMENTS

| | | |
|---|---|---|
| DE | 4200076 | 8/1993 |
| DE | 4217049 A1 | 11/1993 |
| EP | 1026492 A2 | 8/2000 |
| JP | 2000156604 | 6/2000 |
| WO | 9313495 | 7/1993 |

OTHER PUBLICATIONS

Reindl et al., SAW devices as wireless passive sensors, IEEE Ultrasonics Symposium, 1996, pp. 363-367.

Pistor, Drehmomentaufriehmer mit oberflachenwellen-Sensoren unter besonderer Berucksichtigung der krafteinleitung, Universitabibliothek, pp. 89-91, 1999 (no translation).

Schmidt et al., Remote sensing of physical parameters by means of passive surface acoustic wave devices ("ID-TAG"), IEEE Ultrasonics Symposium, 1994, pp. 589-592.

Sachs, Fortschritt-Berichte VDI, Reihe 8, Nr. 729, pp. 62-65, 86-89, and 94-97, (no translation).

* cited by examiner

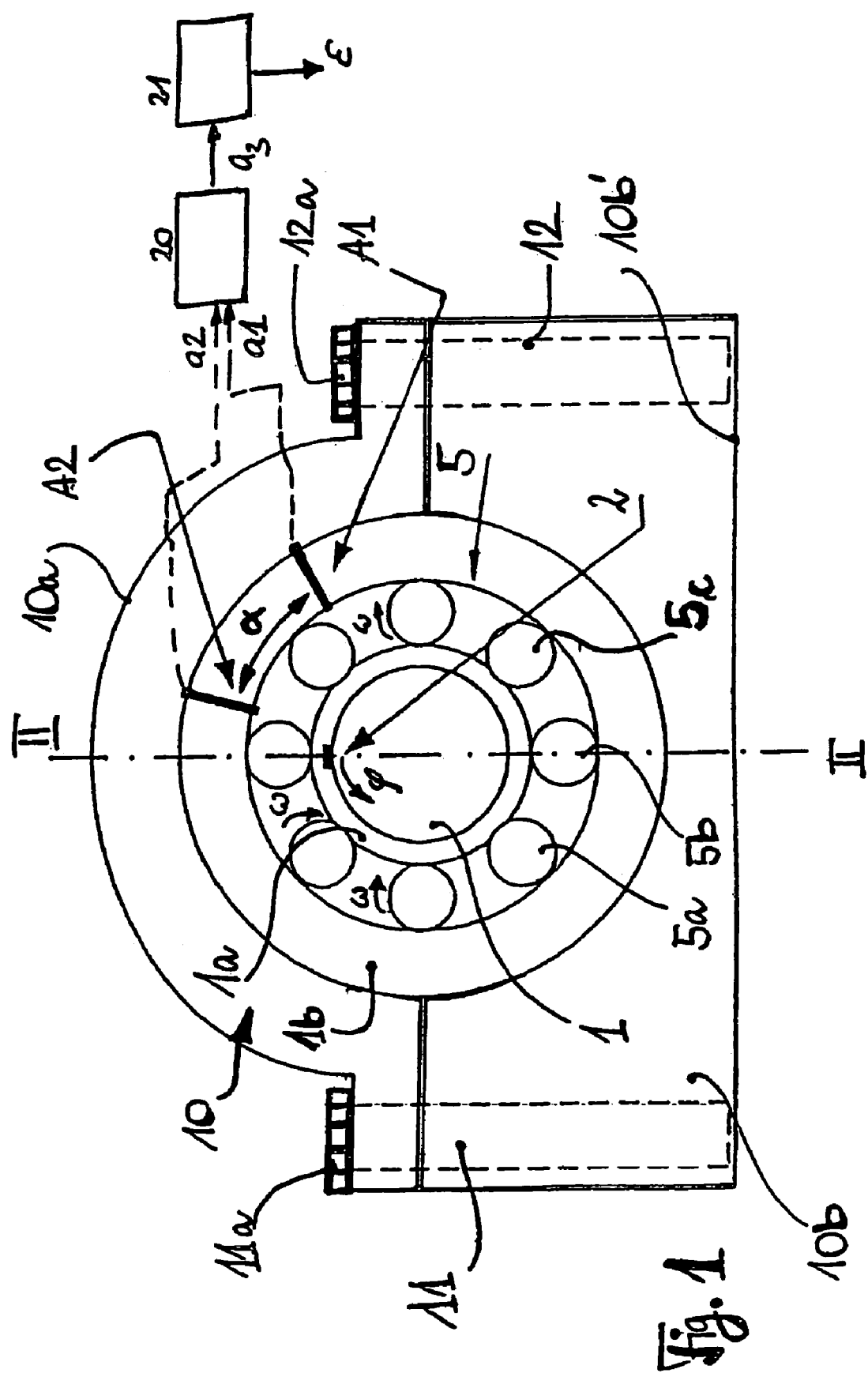

SECTION II-II

CONTACTLESS MEASUREMENT OF THE STRESS OF ROTATING PARTS

The invention concerns a method for measuring, e.g., thermal or mechanical stresses (or loads) of a rotating part, which is mounted in an essentially closed metal housing. Preferably, it addresses rotating parts, which are mounted on a roller bearing, such as shafts. The invention also concerns a device enabling such a measurement, wherein a reflection signal, reflected from the sensor turning with the shaft (also known as a passive transmitter) is received by antennas which convert it into a reception signal, which is evaluated in order to detect or determine (measure) the stress occurring on the rotating part.

Surface acoustic wave sensors, e.g., so-called SAW sensors, can be placed on a rotating part of a bearing as a pick-up, for example, on a roller bearing. Roller bearings themselves are usually installed in essentially closed housings and are thus totally or almost totally surrounded by metal surfaces, which in the case of electromagnetic waves results in interference and, consequently, local extinctions and reception gaps. Reception gaps are a drawback for an essentially steady measurement of the load condition, or a continuous measurement oriented at the periphery of the rotating part.

Surface acoustic wave sensors, or SAW sensors, are described in their structure in publications pertaining to DE 42 17 049 (Siemens), such as Buff, "SAW-Sensors," Sensors and Actuators, A, 1992, pages 117 to 121, and also in an expanded area of application in a publication from the "Ultrasonics Symposium," 1994, pages 589 to 592, authors Schmidt, Sczesny, Reindl, Magori, especially on page 591, righthand column, regarding FIG. 6. The construction of the SAW sensors is known from the above, as is the excitation of these sensors with short bursts of around 80 ns in length, in order to avoid unwanted echoes from the surroundings, when the reflected signal returns after a delay of a few microseconds. The SAW sensors have also been used in similar design for automobiles on a shaft, cf. DE 198 47 291, column 2, lines 45 ff., although two sensors are used for each shaft, each one being arranged in one of two half-shells. The same sensors are also described as torque pick-ups in a dissertation, cf. Pistor, "Drehmomentaufnehmer mit Oberflächenwellen-Sensoren unter besonderer Berücksichtigung der Krafteinkeitung" ("Torque pick-ups with surface acoustic wave sensors under special consideration of the force admission")

Department of Electrical Measurement Techniques, Technical University of Munich, Jun. 28, 1999, FIG. 8.2 with corresponding description. The mounting on an engine shaft as indicated there was accomplished by gluing in an installation space for the pick-up at a distance from the bearing. Furthermore, SAW sensors have been described as wireless passive sensors, cf. Reindl et al., "SAW Devices as Wireless Passive Sensors," IEEE Ultrasonics Symposium, 1996, pages 363 to 367. This refers to several applications of SAW sensors, cf. page 363 under letter B with corresponding literature references on the packing technique (References 15, 16), for placement on rotating shafts or heavily strained drive units (References 17, 18) or for detection of an air pressure of a moveable vehicle (References 14, 16). Yet another application is a "funkabfragbarer Drehmomentsensor auf de. Basis von Oberflächenwellen-Verzögerungsleitungen" ("telemetered torque sensor based on surface acoustic wave delay lines") Fortschritt-Berichte VDI, series 8, No. 729, VDI Verlag 1998. A rotating part and a stationary part are coupled by telemetry according to FIG. 2.1.6 there, and a dipole array is considered as the antenna, cf. page 84, 85.

The invention starts from the technical statement of the problem of enabling the noncontact measurement of a mechanical stress on a rotating part, such as a shaft, while at least reducing or preferably entirely avoiding reception gaps in the evaluated reception signal, despite the essentially closed metallic bearing housing. It is not a question of optimizing the geometry of the housing or the bearing, but rather the measurement itself, which should furthermore work reliably over the entire angle of rotation of 360°, with a cost-favorable design and rather uncomplicated electronic evaluation system.

This problem is solved with at least two reception signals coming from at least two antennas not rotating along with the rotating part. These antennas are coordinated with the bearing housing and arranged in it with spacing, preferably at the circumference (Claim 12). With a minimum of two antennas arranged at a distance (Claim 20), it is possible to furnish reception signals which, taken together, enable an improvement or optimization of a resulting working signal, which has at least no complete reception gaps in terms of the circumference, i.e., upon 360° rotation of the rotating part (Claim 1).

The sensors used are, for example, SAW sensors, which work passively with surface acoustic waves and reflect or send back with time delay the electromagnetic waves beamed in. A travel time in the sensors is utilized for the reflection. For this, the sensor is beamed with a high-frequency pulse and this pulse is picked up by an antenna, transformed into a surface wave in an interdigital converter, and this wave is reflected with time delay by reflector sites on the sensor, so that travel time differences occur in the several reflected signals. This minimum of travel time difference results from the spacings of the reflector sites on the sensor. Based on their travel time difference, the reflection signals represent a geometrical length, and changes in this travel time (or the spacing of the two reflection signals) produce a mechanical strain in the sensor. This strain can be used to determine a mechanical stress of the rotating part on which the sensor is firmly applied. Whereas a mechanical loading produces a strain or contraction (Claim 10), a heat load is the basic cause of a change in the phase velocity of the surface wave at the SAW sensor, which likewise alters the travel time (between the particular reflector site and the converter or interdigital transformer). This produces a load-dependent or temperature-dependent signal magnitude as the output quantity of the passive sensor, which can also be viewed as a transmitter in terms of the reflected signal. This dependency on the physical quantity of influence ensures a "passive transmission signal" of the sensor, which results in a contactless measurement opportunity as compared to the input signal or a reference signal of constant phase.

Although slight changes cannot be measured directly in terms of the travel time, they can be ascertained by a measurement of the relative phase between the particular reflected signal and a frequency of a reference oscillator.

The mechanical load on the rotating part alters the geometry of the (passive) sensor, which by expanding or contracting (Claim 13, Claim 17) produces a change in the reflected signal, which can be measured without contact by the several reception antennas and an electronic evaluation system connected to them (Claim 1). The minimum of two and preferably only two reception signals are taken to a signal stage prior to the evaluation circuit, which either combines the two signals (Claim 4, second alternative) or switches these signals so that a sufficient reception signal is always available for the subsequent evaluation of this signal (Claim 4, first alternative, and Claim 7).

Both signals are used to determine the mechanical stress of the rotating part, yet not necessarily at the same time, but preferably at a time interval corresponding to one mechanical rotation of the rotating part (Claim 11, Claim 21). In a possible selection of a maximum value, the particular reception signal, which is more favorable, can become the working signal, used to measure the load (Claim 10, Claim 16). Only one electronic evaluation system is required for this (Claim 15), which undertakes the evaluation with the (one) working signal.

The possible switching between, for example, two available signals, each independently possessing reception gaps, extinctions, or fading of field strength, can be oriented to a threshold value (Claim 8). In this case, the active reception signal lying above the threshold value during the measurement is used to evaluate and determine the especially mechanical loading. If this active reception signal falls below the threshold value, the heretofore-passive reception signal, which was available but not actively evaluated up to this time, is used for the evaluation.

The threshold value can be adaptive, i.e., it can be adjusted or updated (Claim 14).

Generally speaking, the antennas are arranged so that the two antennas do not put out a reception signal having a minimum or a reception gap at the same time (Claim 5, 6). An opposite sequencing of the reception signals is recommended, such that one signal is rising when the other signal is falling. Most preferably, the minimum and maximum of the two signals can be essentially attuned to each other, although this is heavily dependent on the nondeterministic geometry of the bearing housing.

Preferably, a rotating part is fashioned as a shaft and held by a roller bearing, such as a pedestal bearing (Claim 3). The fixed arrangement of the sensor on the shaft, as the rotating part, should then be understood to the effect that a mechanical strain or heat load on the shaft is transmitted to the sensor, so that its state can be measured in terms of the travel time of the surface acoustic waves by using electromagnetic waves reflected from the housing.

The electromagnetic pulse can be beamed in, for example, by one of the two or more antennas, which can also work as reception antennas. The beaming of the pulse at the sensor ensures a reflection and a division of the frequency pulse into several electrical signals, which are put out by the several spatially separated reception antennas (Claim 19). Preferably, the electromagnetic signal is a pulsed high-frequency signal (Claim 18), which is reflected by the sensor (Claim 9).

Thanks to the described switching between the minimum of two antennas, it is possible to eliminate from the measurement the reception gaps or extinctions caused by standing waves. Although the specific effects of the interference in a specific bearing housing are not known, the measurement arrangement functions reliably, regardless of a constructive or destructive interference (increasing or decreasing of signal strength by reflections of the electromagnetic waves).

Furthermore, the shaft generally projects beyond the bearing and does not produce a shadow in the bearing housing—unlike the case of open exposed bearings.

Sample embodiments explain and amplify the invention.

FIG. 1 is, in front view, a first sample roller bearing 5 as a pedestal bearing with a rotating shaft 1 and two reception antennas A1, A2 in order to illustrate a first example of the measurement method and a first example of the measurement construction.

Figure 1A:
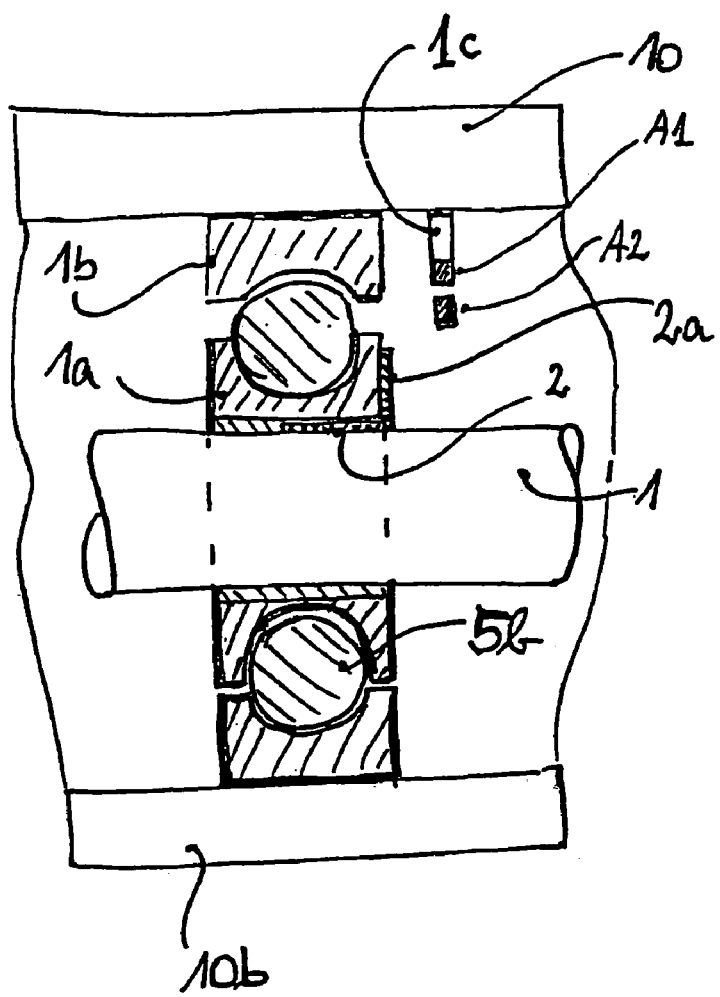
FIG. 1a is a cross-sectional view along plane II—II.

FIGS. 1 and 1a illustrate a schematic view of a bearing. A bearing housing 10 has an upper segment 10a, vaulted according to the shape of the bearing 5, and a base segment 10b with bottom 10b'. Two bearing components can be removably joined to each other by screw installations 11, 12 with screw heads 11a, 12a, so that one bearing shell 1b carries several roller elements 5a, 5b, 5c, etc. (for example, balls or cylinders), which support a rotating shaft 1. The supported roller elements 5a, 5b, 5c, etc. are arranged between an inner race 1a and an outer race 1b as a shell. The inner race 1a is firmly arranged on the shaft 1, for example, by a shrink fit. The outer race supports the roller elements. The bearing shown can also be termed a pedestal bearing with corresponding housing.

The rotary movement of the shaft is symbolized by a rotation ω of the individual roller elements 5a, 5b, etc. (in short: 5) and the shaft 1 is designated by angle of rotation φ, which indicates the instantaneous value of the angle of rotation φ(t) of the sensor 2, while 0°≦φ≦360°.

The roller elements 5a, 5b, etc., are arranged orbitally around the shaft 1 at essentially identical spacings. The sensor 2, which in the example is a SAW sensor for reflection of electromagnetic surface acoustic waves, is firmly arranged on the shaft 1 and joined to the bearing race 1a so that mechanical alterations within the shaft or the bearing race, such as expansions, stresses, or contractions, are transmitted to it and also change it mechanically in accordance with the loading.

Not rotating and arranged at a distance from the sensor 2 are two antennas A1, A2, which have a circumferential spacing α. The two antennas are electrically connected by one line each to an electronic evaluation system, which consists of a switching unit 20 and an evaluating unit 21. The evaluating unit 21 puts out a signal ε (epsilon), which is representative of the mechanical or thermal loading of the shaft 1 at the position where the sensor 2 is firmly arranged on it. Therefore, this is a contactless measurement of the mechanical loading of the rotating part. Of course, ε(φ) can be a function dependent on either the angle of rotation of the shaft or a time function ε(t), if the shaft is a drive shaft or a take-off shaft which transmits or applies a torque.

From the axial cross section II—II, one notices the arrangement of the sensor 2, which is provided on the shaft and extends axially along a partial length of the inner race 1a, with an antenna 2a arranged essentially perpendicular to this. On the same side of the bearing, also at the axial spacing, there are provided two reception antennas A1 and A2 on a carrier piece 1c, one of which antennas can also be used as the transmitting antenna.

The method described for the arrangement reduces reception gaps and ensures that the sensor can be sampled (evaluated) in any angular position of the bearing, corresponding to each angular position of the shaft 1, without employing an additional electronic evaluation system, but instead using only one electronic evaluation system 21, connected to a circuit arrangement 20, which shall be described hereafter. Thus, the straining of the bearing, particularly the shaft 1, can be continuously determined (in terms of time and/or angle of rotation). This determination is a contactless measurement, which can also be considered a determination of the mechanical loading. A thermal measurement is likewise possible, as is a combination of the two.

Figure 2:
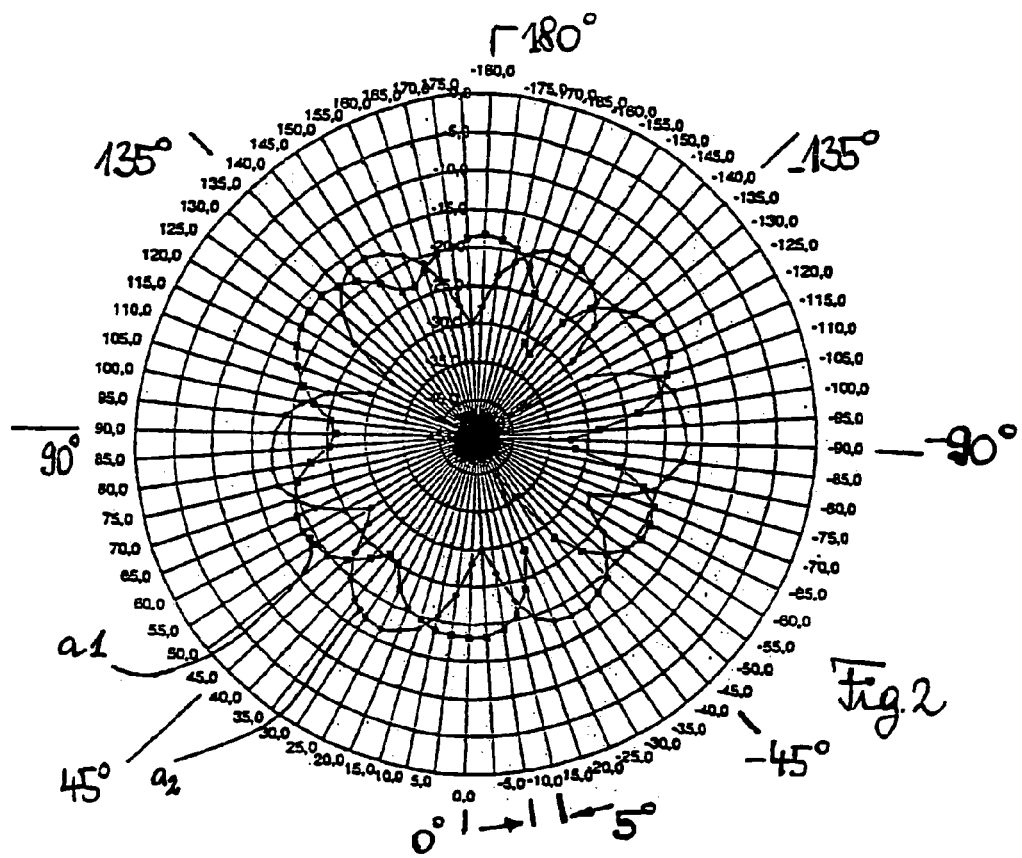
FIG. 2 is a field strength distribution in a bearing housing for two antennas arranged staggered, with a first signal a1 of the first antenna and a second signal a2 of the second antenna. Both signals are angle-independent in amplitude, and a rotation angle of 360° is assumed, over which the measurement should function reliably.

In the bearing housing 10, in the upper segment 10a, there are placed two antennas, whose spacing is chosen so that one antenna is situated in a field strength maximum when the other antenna has a reception gap in terms of its reception signal. For this, refer to FIG. 2, which shows the two reception signals a1, a2 as a function of the angle of rotation of the sensor 2. These are not in equal phase, but rather in opposite phase, one maximum and one minimum being coordinated with each other such that the two-field strength curves as a function of angle of rotation, and thus never possess a minimum at the same time.

Figure 3:
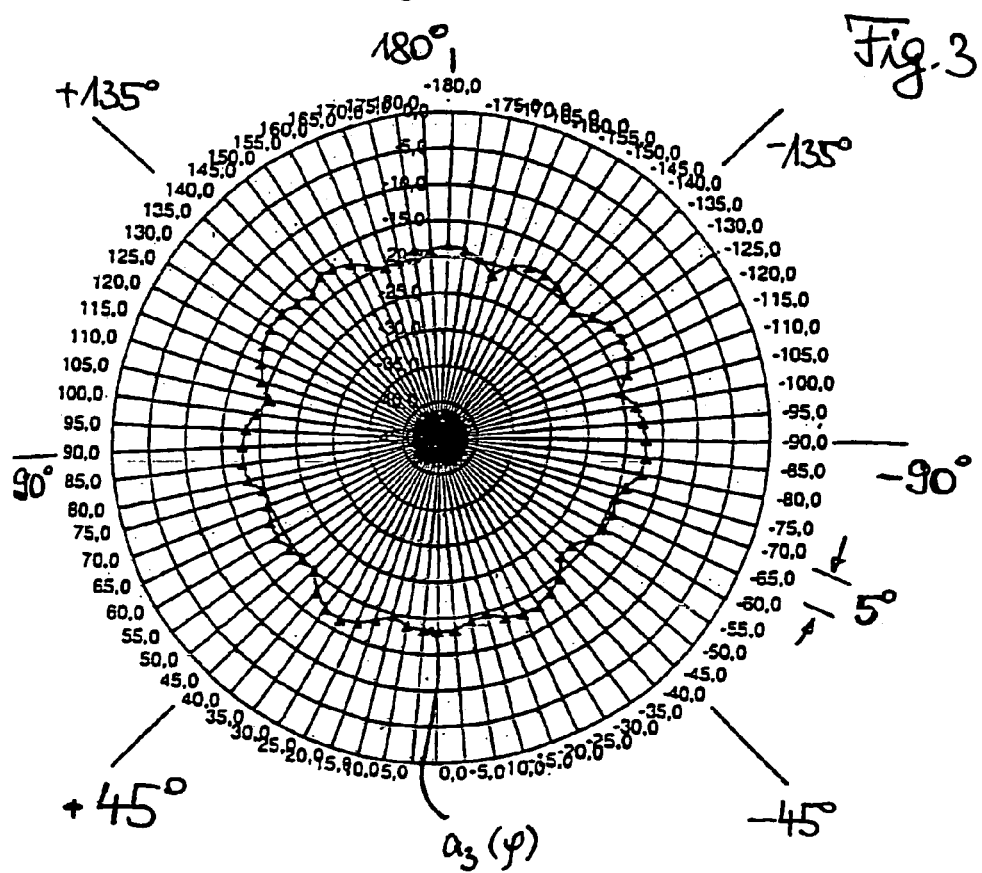
FIG. 3 is a resultant field strength distribution, such as results from a combination or juxtapositioning of the two individual signals a1 and a2 as a resultant sequence a3, likewise angle-independent.

By switching the two signals a1, a2, one can ensure that a working signal a3 is formed, as shown by FIG. 3. This working signal a3 is likewise dependent on the angle of rotation (p and exhibits a much more uniform variation in terms of signal strength than either individual signal a1 or a2. The switching is provided by the switching arrangement 20, where both signal functions a1, a2 are available at the same time, but only one of them is relayed as the working signal a3 to the evaluation circuit 21.

Thus, a more uniform reception field strength is subjected to the evaluation, so that a more reliable loading value $\epsilon(\phi)$ or $\epsilon(t)$ is obtained.

While the bearing and, with it, the sensor 2 is rotating, field strength minima move past the firmly positioned reception antennas a1, a2. One of these two antennas a1 or a2 can at the same time be a transmission antenna, to beam out a high-frequency pulse, which is reflected by the sensor 2. The reflected signals are picked up by the two antennas, at a spacing of $\alpha$, in different places, and form two independent electrical reception signals a1, a2, which by their nature are generally not the same, due to the spatial distancing of the antennas. These two reception signals then form, via the switching arrangement 20, the working signal, from which the load value being measured can be calculated.

The reception quality is no longer dependent solely on one antenna and its arrangement, but instead both antennas can be positioned such that the two reception signals, taken together, are no longer disturbed as a result of the reflected pulses in order to determine the strain.

As the circumferential spacing $\alpha$, one can use angles between 15° and 90°, especially in the range of 20° to 45°, as shown in FIG. 1. Angles below 90° are preferred. As for the duration of the high-frequency pulse, which is composed of high-frequency components, the times can be attuned to the bearing housing. The high-frequency pulse, which is also known as an "interrogation pulse," is attuned in its temporal length to the spacing of the reflectors at the sensor. The length of the pulse should at maximum only be half of the minimum time spacing between two neighboring reflectors at the sensor. Otherwise, interference may result between the outgoing transmission pulse and the reflected response pulse. For example, the minimum temporal spacing of two reflectors is 160 ns. This yields a maximum pulse length of essentially 80 ns. The pulse length can also be chosen such that the major echo signals of the surroundings have decayed before handling the reflection signal of the SAW sensor that is put out by its antenna 2a.

Additional reception antennas, not depicted, can be added, which then also contribute their reception signals to the switching arrangement 20, which then selects as working signal a3 the qualitatively strongest or otherwise combines the more than two reception signals available.

The switching point at which a change occurs in the switching arrangement 20 between the first reception signal a1 and the second reception signal a2 can be made dependent on a threshold value. The shaft and the bearing can have different rotational speeds.

There need not be a connection to a position controller, so that the time of switching from the first antenna to the second antenna, or the particular electrical reception signal itself is what is determined, therefore, from the signals themselves, their signal amplitude or their variation.

The switching time is determined from at least one of the reception signals themselves, $a1(t)$ or $a2(t)$.

Other methods can also be used to determine the working signal $a3(t)$, being realized in the switching arrangement 20.

Thus, the signal amplitudes of the reception signals can be compared. If the signal variation of the presently active reception signal falls below a predetermined set value, switching can occur to the reception signal of the other antenna.

The presently active signal is the one that forms the working signal a3, while the other reception signal is passive for the time being and serves only for comparison purposes. If the predetermined set value is used, however, one only needs to compare the presently active signal to the threshold value.

The assigning of the threshold value depends on the installation and will differ from one bearing to another. It can be determined during the installation, or the system can be self-adapting, in which case the switching arrangement 20 itself searches for a switching threshold and even automatically tracks it.

This method ensures a more uniform reception quality for a maximum number of evaluable reception pulses put out by the transmission antenna, which are reflected by the sensor 2 and then converted into reception signals at the individual antennas.

Another variant of the operation of the circuit 20 for selection of more than just one antenna signal involves alternation. A pulse is alternately received by antenna A1 and then by antenna A2 and the strongest value is selected as the working signal a3 for the further processing with the evaluation circuit 21. A pulse is activated by a transmission antenna, for example, antenna A1, in order to form with antenna A2 the reception signal from the signal reflected by the sensor 2. This reception signal's amplitude or signal strength is saved in memory. With a subsequently activated second transmission signal from, for example, the other antenna A2, the corresponding reception signal of the first antenna A1 is likewise measured by the circuit 20 and compared to the signal strength of the previously measured signal. The stronger signal will be used for the evaluation. In this way, half of the accumulating information or pulses is lost, but the system is secure, since the better value of the two or even more reception signals is always made available when using several spaced antennas and accordingly several reception signals.

The antennas are alternatingly used as transmission and reception antenna.

Another variant is to alternately receive one pulse with antenna A1 and then a pulse with antenna A2. The two signal values of the reception signal are weighted in terms of reception field strength and combined, in particular, added up. Here, all pulses transmitted are converted into reception pulses and evaluated, but the information content of certain pulses might not be of such high quality, which ultimately produces a result not as good as the first method described, in which the signal amplitude was compared against a threshold value.

The alternating reception can also be modified into a joint reception, in which a separate transmission antenna is added to the system, whose high-frequency transmission pulse is converted by the two reception antennas A1, A2 into two simultaneously occurring reception signals a1, a2.

When determining the mechanical change in the sensor, e.g., the SAW sensor strain, the phase of the reflected pulse is evaluated by determining an in-phase and a quadrature value of the carrier signal. This information can also be used to determine the signal amplitude, which amplitude is then used according to the above-described examples to determine the working signal a3 and/or to determine a threshold value.

The invention claimed is:

1. A method for measurement of mechanical loads or stresses of a rotating part in an essentially closed metal housing for a bearing; wherein the rotating part carries a sensor, which reflects electromagnetic waves and changes property in measurable fashion based on the strain or load of the rotating part; wherein two antennas, receiving reflected signals of the sensor, are arranged such that they cannot turn relative to the sensor and are spaced in the housing, and these antennas put out two electrical reception signals, which are taken to an electronic evaluation system, in order to utilize both reception signals for determining the load or strain of the rotating part.

2. The method of claim 1, wherein the sensor is firmly applied to the rotating part and is deformed along with it in a measurable fashion.

3. The method of claim 1, wherein the rotating part is mounted in the housing such that it can rotate, as a shaft on a roller bearing in the bearing housing.

4. The method of claim 1, wherein the load or strain of the rotating part
   (i) is determined through the mechanical deformation of the sensor either from the one reception signal or the other reception signal;
   or
   (ii) it is determined from a combination of the two reception signals.

5. The method of claim 1, wherein the two antennas are arranged at a distance, in particular, a circumferential spacing ($\alpha$), so that due to reflected signals of the sensor a first reception signal from the one antenna is rising when a second reception signal from the second antenna is falling.

6. The method of claim 5, wherein a minimum of the first reception signal in the first antenna occurs essentially at a maximum of the second reception signal of the second antenna, for the same angular position ($\phi$) of the rotating part, in particular, the sensor on the rotating part.

7. The method of claim 1, wherein the electronic evaluation system switches between the two reception signals in order to evaluate the first signal at a first time range and the second signal at a later time range in order to measure the strain.

8. The method of claim 7, wherein the switching occurs essentially when the currently measured (active) reception signal falls below a threshold value, in particular, below a signal strength which is possessed by the second, not yet evaluated (heretofore passive) reception signal of the second antenna.

9. The method of claim 1, wherein the sensor is a passive sensor, which picks up electromagnetic waves, delays them by a travel time and reflects them, in particular, an SAW sensor for reflection of surface acoustic waves that are beamed in by an antenna, especially as a pulse of high-frequency components.

10. The method of claim 9, wherein the sensor has several reflector sites, which are arranged at a spacing on the sensor and which successively reflect an incident high-frequency pulse, in order to obtain a reflected signal which is load-dependent or temperature-dependent by at least one travel time of the shaft between one of the reflection sites and the conversion site, making it possible to measure the phase and obtain information as to the strain on the rotating part.

11. The method of claim 1, wherein the measurement occurs during a rotation ($\omega$) of the rotating part.

12. A device for determination of loads on a rotating part in an essentially closed metal bearing housing, wherein the rotating part carries a transmitter, which reflects electromagnetic waves and which can be deformed in measurable fashion by virtue of a load on the rotating part; and wherein two antennas—receiving reflected signals of the transmitter—are arranged such that they cannot turn relative to the transmitter and are at a spacing ($\alpha$) in the bearing housing, in order to put out at least two reception signals to an electronic evaluation system, in which both reception signals can be evaluated—jointly or alternatively—in order to determine the load on the part.

13. The device of claim 12, wherein the mechanical deformation of the transmitter or sensor which is determined is its extension or contraction in terms of the reception signals formed from the reflected signals of the two antennas, by evaluating an in-phase and a quadrature value of the reception signals.

14. The method of claim 7, wherein a threshold value is determined for the switching from at least one of the measured reception signals, in particular, it is automatically tracked.

15. The device of claim 12, wherein only one electronic evaluation system is provided for both reception signals of the two antennas.

16. The device of claim 12, wherein a thermal influence on the transmitter is measured, which represents a uniform thermal load or stress on the rotating part.

17. The method of claim 1, wherein a mechanical load or stress on the rotating part is measured, as a consequence of a mechanical change, such as stretching or compression of the sensor.

18. The method of claim 1, wherein the electromagnetic signal is a pulsed high-frequency signal.

19. The method of claim 18, wherein at least one of the two antennas is used as a transmission antenna for the electromagnetic waves, in particular, the high frequency pulse, to be reflected by the transmitter or sensor for both antennas as the reflection signal in forming several reception signals.

20. The device of claim 12, wherein more than two nonrotating antennas are provided for reception of the reflected signal of the passive transmitter, which send their several reception signals formed from the at least one reflected signal to an electronic evaluation system for evaluation.

21. The device of claim 12, wherein a working signal is formed from the minimum of two reception signals of a maximum-value circuit as the particular maximum value for the two individual reception signals and this is sent on to an evaluation circuit.

* * * * *